United States Patent [19]

Hochreiter et al.

[11] Patent Number: 5,337,120
[45] Date of Patent: Aug. 9, 1994

[54] SCANNING APPARATUS GATE DRIVE SYSTEM AND METHOD

[75] Inventors: Eric P. Hochreiter, Bergen; Franklin D. Ehrne, Rochester; William I. Morris, Oakfield; Frederick J. Schwab, Churchville, all of N.Y.

[73] Assignee: Eastman Kodak Company, Rochester, N.Y.

[21] Appl. No.: 943,427

[22] Filed: Sep. 14, 1992

[51] Int. Cl.$^5$ .............................. Q03B 27/62
[52] U.S. Cl. ....................... 355/47; 355/50; 355/76; 353/95; 352/229
[58] Field of Search .............. 355/47, 48, 50, 75, 355/76, 104, 108, 109, 111; 352/228, 229, 230; 353/95; 242/55, 71, 76; 226/76, 83, 84, 85

[56] References Cited

U.S. PATENT DOCUMENTS

| | | |
|---|---|---|
| 3,473,874 | 10/1969 | Hall et al. .............................. 355/52 |
| 4,774,553 | 9/1988 | Blanding et al. ..................... 355/75 |
| 4,965,632 | 10/1990 | Jadrich et al. ....................... 355/76 |

Primary Examiner—Michael L. Gellner
Assistant Examiner—D. P. Malley
Attorney, Agent, or Firm—Edward Dugas

[57] ABSTRACT

An apparatus for driving a scanning gate of a photographic film scanning apparatus utilizes a reversible m s , stepping motor, and a system driven by the motor for moving the gate in a pendulum-like manner. The means comprises a shaft, a gear sector fixedly connected on the shaft and a crank arm fixedly connected on the shaft so as to operatively engage the scanning gate, and a worm configured to be driven by the motor. A biasing device is arranged between the gear sector and a chassis of the scanning apparatus to maintain a positive engagement between the worm and the gear sector. Additional biasing devices are connected between the crank arm and the gate to provide for adjustment of the gate about two axes. The additional biasing devices between the crank arm and the gate include plural springs extending laterally from a pin projecting from a surface of the crank arm facing the gate to a pin mounted on the gate and having an axis parallel to the axis of the pin projecting from the surface of the crank arm, and plural springs extending from pins projecting from opposite sides of the crank arm to pins on the gate having axes parallel to the axes of the pins extending from the opposite sides of the gate.

11 Claims, 11 Drawing Sheets

SCANNING APPARATUS GATE DRIVE SYSTEM AND METHOD

FIELD OF THE INVENTION

The present invention relates to a gate drive system and method for a photographic film scanning apparatus and, more particularly, to a drive system which permits precise movement of the gate in a pendulum-like manner through an eccentric crank-pin arrangement and which also permits adjustment of the gate about two axes for precise alignment of the gate for the scanning operation.

BACKGROUND ART

Several types of scanning apparatus for scanning negative still and motion picture films are known and currently used by photographic labs. Eastman Kodak Company now offers a PIW 2200 system which uses a Kodak 2000 scanner having a flat gate for handling film strips and slides to digitize an excellent high resolution image for storage on a compact disc. This scanner cannot handle continuous rolls of film as would be desirable for large numbers of orders. Another type of scanner uses a drum for scanning motion picture film. Other types of drum scanners are known for scanning continuous rolls of film or single negative, although no drum scanner does both. In addition, screw-driven flat bed scanners are known. All of the known scanners have, however, limitations in terms of their versatility in that they are not capable of providing a high resolution scan while, at the same time, avoiding the need for interchangeability for handling first order and reorders for photographic processing labs.

SUMMARY OF THE INVENTION

An object of the present invention is to provide a drive system which is simple in construction yet assures precise movement of the gate through an arcuate scanning motion.

Another object of the present invention is to provide a drive system which drives a gate in a pendulum-like manner in one axis and permits adjustment of the gate and two other axes for precise alignment of the aperture in the gate with the optical system.

These objects have been achieved in accordance with the present invention by providing a worm-gear selector drive which eliminates backlash to the maximum extent possible through the use of a biasing device, such as a tension spring between the sector and the optical chassis, and provides an eccentric crank-pin arrangement which is connected to the gate through biasing springs and the like to allow for adjustment in the Θ X and Θ Y directions.

BRIEF DESCRIPTION OF THE DRAWINGS

These and other objects, features and advantages of the present invention will become more apparent from the following detailed description of a currently preferred embodiment of the drive system in accordance with the present invention when taken in conjunction with the accompanying drawings wherein.

MODE FOR CARRYING OUT THE INVENTION

Figure 1:
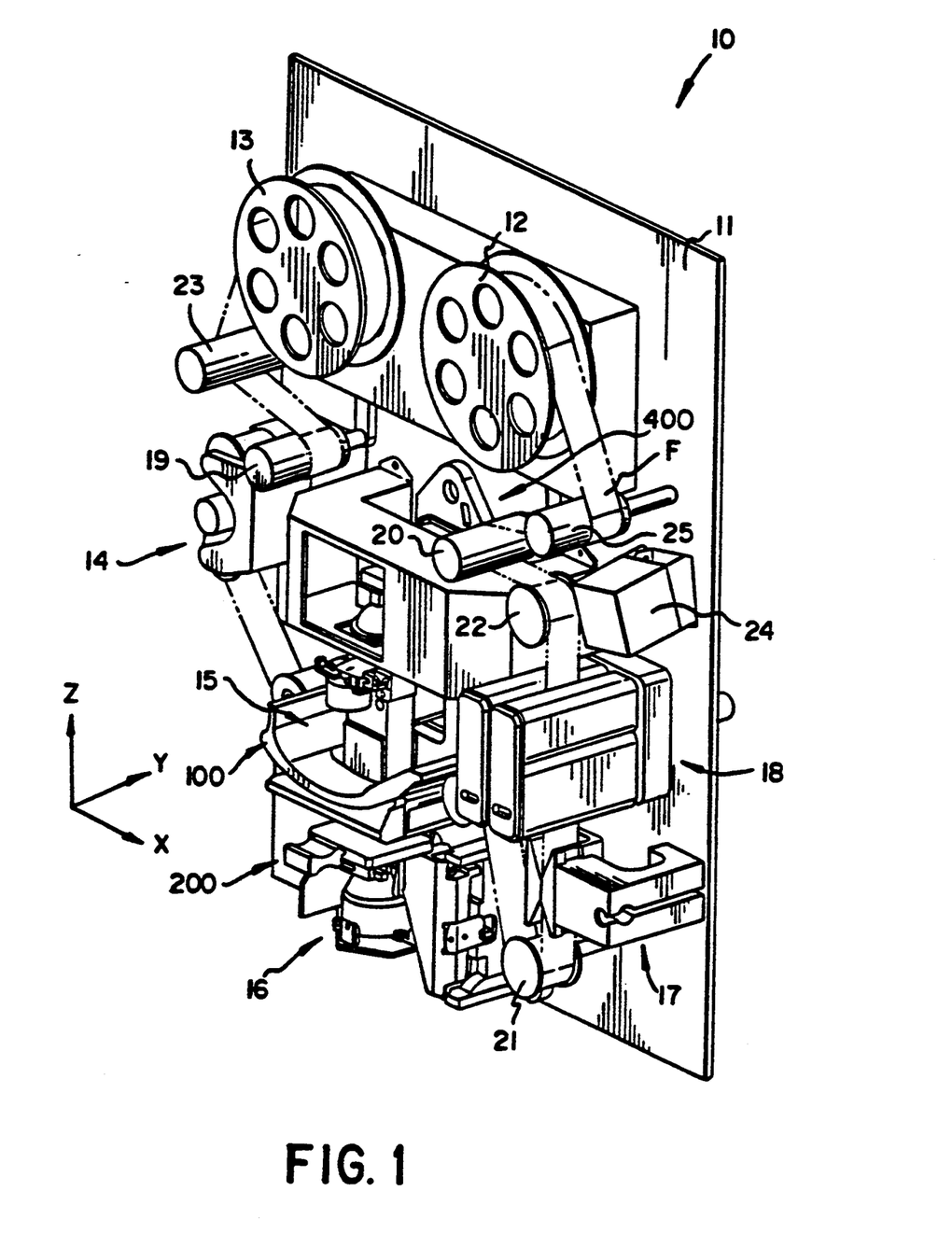
FIG. 1 is a perspective view of the major components of the scanning apparatus, which components are mounted on a cabinet board or frame, utilizing the clamping arrangement of the present invention.
Figure 2:
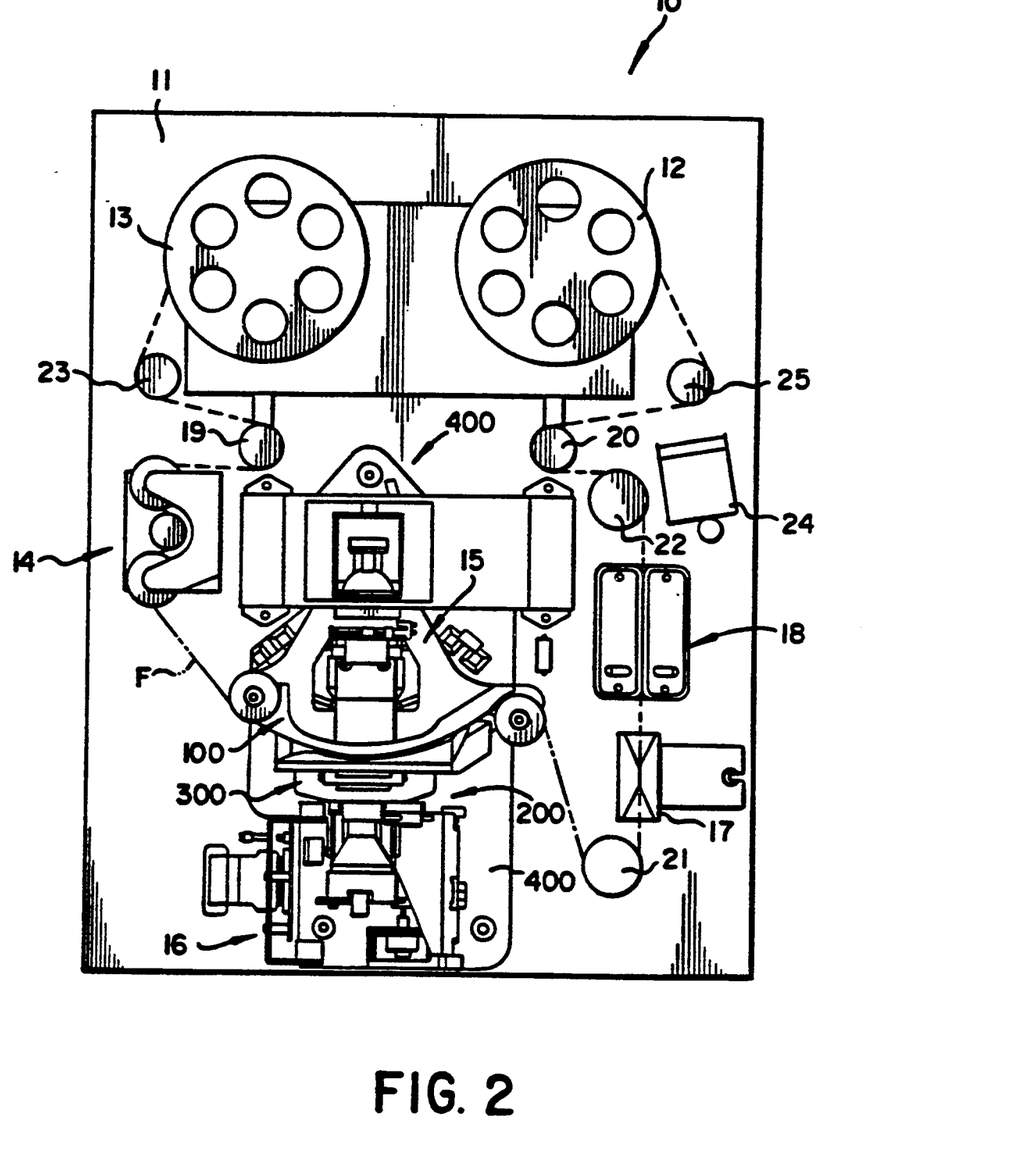
FIG. 2 is a front elevational view of the component assembly shown in FIG. 1.
Figure 3:
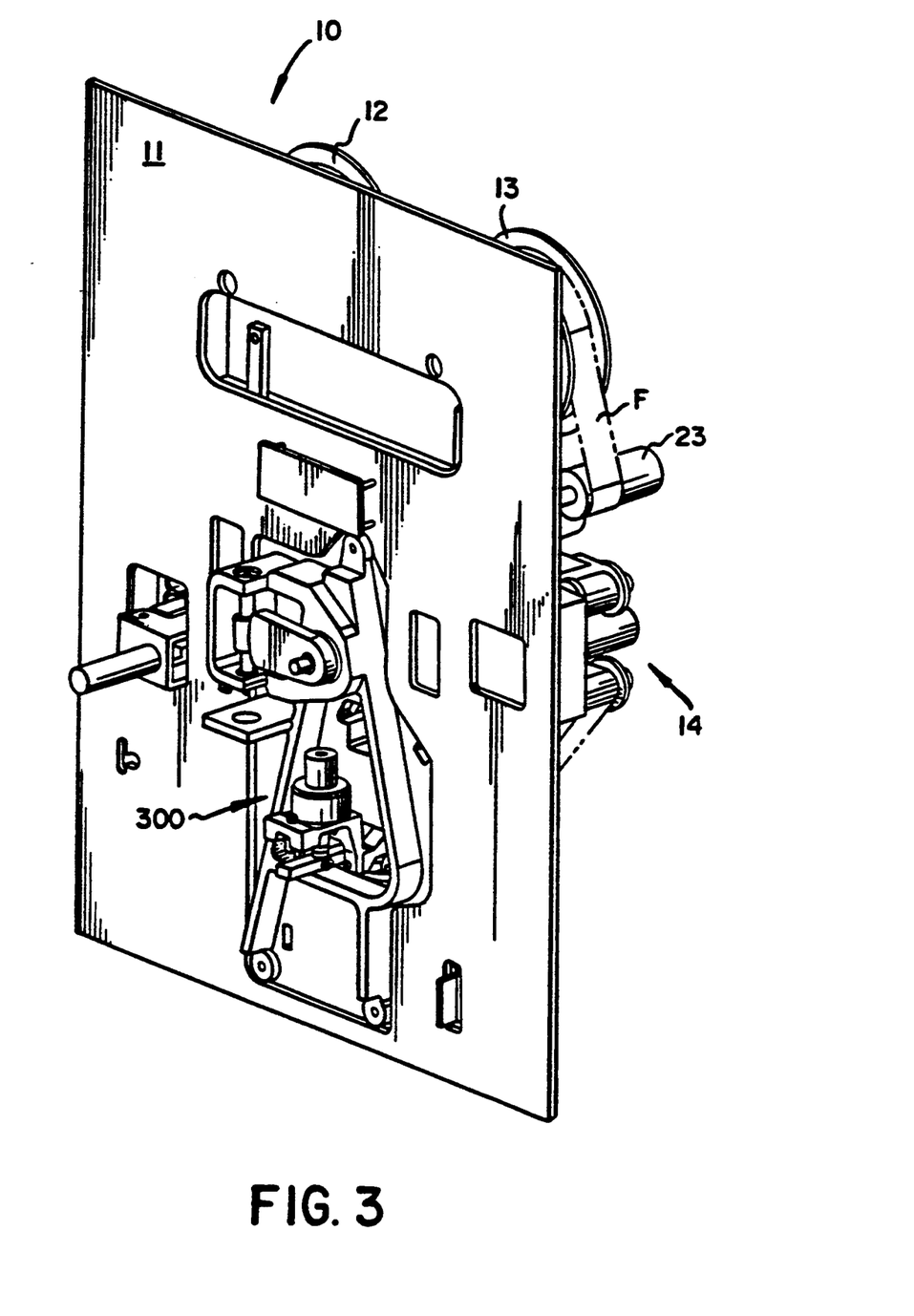
FIG. 3 is a perspective view similar to FIG. 1 but showing the reverse side of the board carrying the components.
Figure 4:
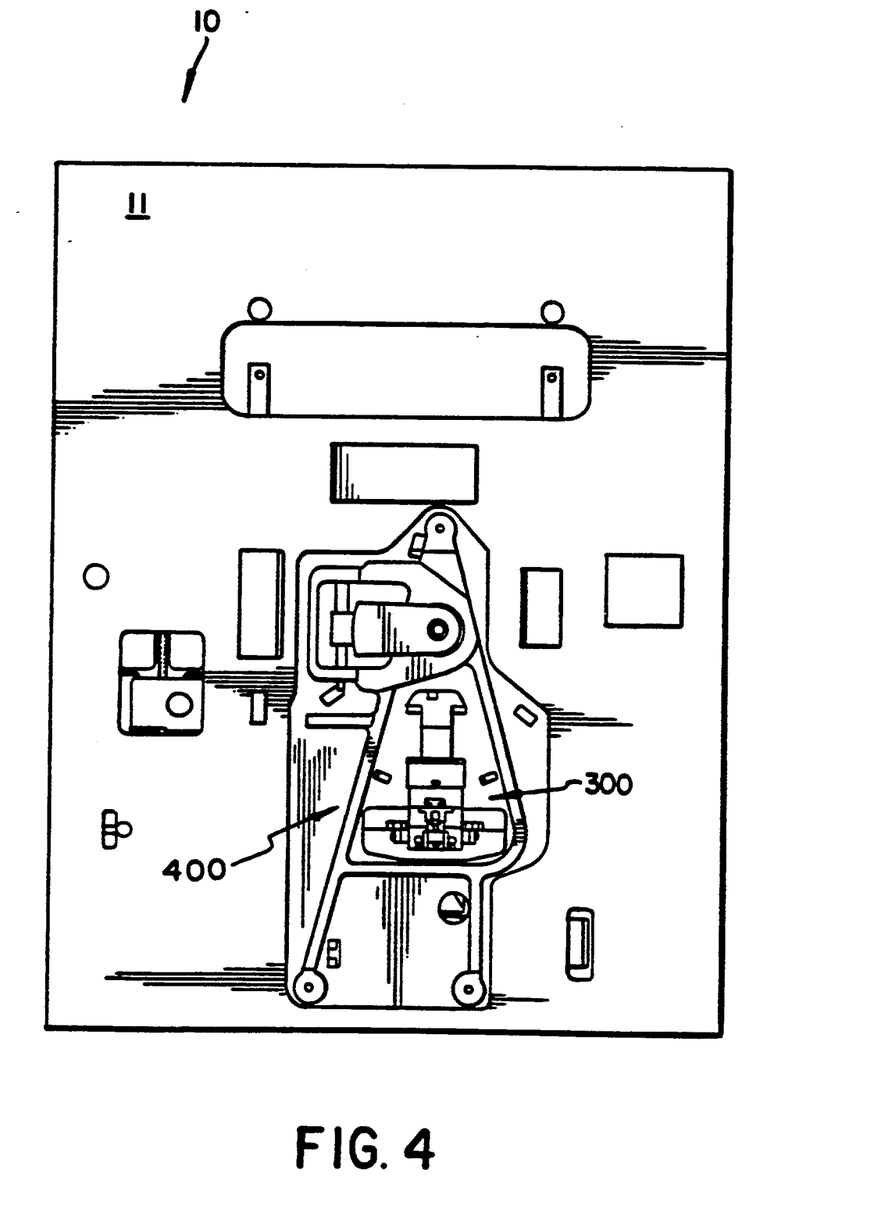
FIG. 4 is a rear elevational view of the reverse side shown in FIG. 3.

Referring now to the drawings and, in particular, to FIGS. 1 and 2, a photographic negative film scanning apparatus for scanning and digitizing images on frames of the film is designated generally by the numeral 10. The apparatus 10 includes a board 11 on which are mounted conventional film transport reels 12, 13, a capstan drive 14, an integrating cavity 15 carried by an optical chassis 400, a conventional imager with imaging board designated generally by the numeral 16, a DX bar code reader 17 for determining the type of film being processed, a film cleaning apparatus 18, a bar code reader 24 for reading order processing data, and spring-biased tension rollers 19, 20 to maintain the film at a substantially constant tension during the high resolution scanning pass. In addition, other idler rollers 21, 22, 23 and 25 are mounted on the board 11 to maintain a smooth but tight path for the film F shown in long and short dash lines. A gate 100 also mounted on the optical chassis 400 and seen in more detail in FIG. 5, is rotated during the high resolution scanning pass in an arc of about 6½° on both sides of a vertical axis constituting an initializing position in which the gate 100 assumes during the low resolution operation.

The optical chassis 400 is described in co-pending application Ser. No. 943,426, entitled OPTICAL CHASSIS, filed in the names of Eric P. Hochreiter, et al. on Sep. 14, 1992. The film F which is supplied from reel 12 shown in FIGS. 1 and 2 is advanced by the capstan mechanism 14 by pulling the film F from the supply reel 12 over the gate 100 and onto the take-up reel 13. It will be understood, of course, that the capstan mechanism 14 can be disposed on the right-hand side of the scanning apparatus to push the film F over the gate 100 without departing from the scope of the present invention.

A lens protector device 200 is provided in close proximity to the optical scanning mechanism 16 to protect its lens from dust and the like as more fully described in co-pending application Ser. No. 943,424 entitled LENS PROTECTOR DEVICE, filed in the names of Tomi Lahcanski, et al. on Sep. 14, 1992. Inasmuch as the details of the lens protecting device 200 and the optical chassis 400 are not necessary for an understanding of the present invention, further details with respect thereto are dispensed with and the contents of said applications are incorporated by reference herein for background as to the overall construction of the scanning apparatus.

Figure 5:
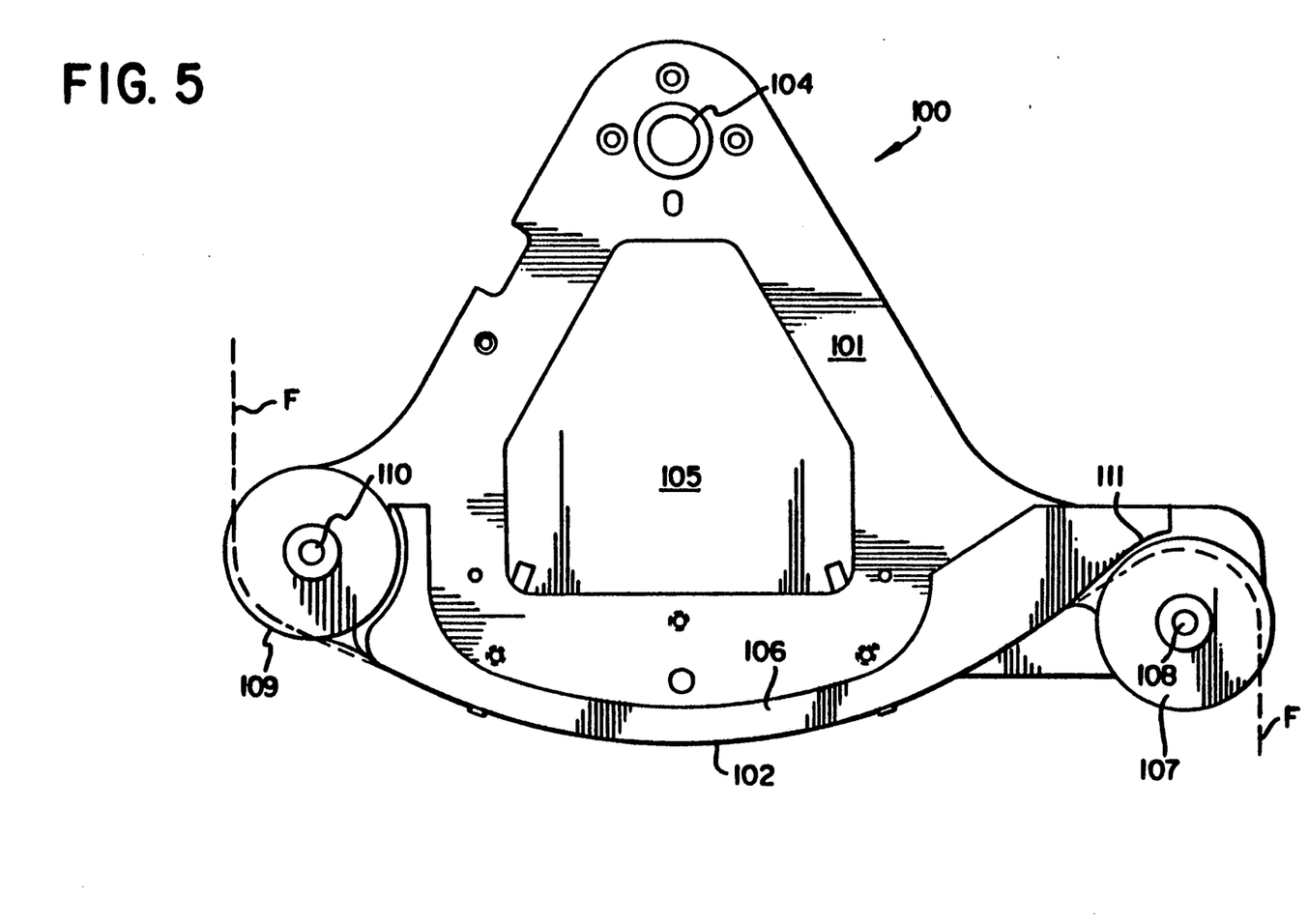
FIG. 5 is a front elevational view of one embodiment of a scanning apparatus gate.

Referring now to FIG. 5, it can be seen that the gate 100 is a pie-slice-shaped circular arcuate segment supported at the optical chassis 400 and pivots about a shaft 502 of the drive system on a spherical bearing 104 mounted in a vertical web 101 through which the drive system shaft 502 is mounted. The details of the gate per se form no part of the present invention, except as described below, and are otherwise provided in co-pending application Ser. No. 943,425 entitled ARC-SEGMENT-SHAPED GATE FOR PHOTOGRAPHIC FILM SCANNING APPARATUS filed in the names of Eric P. Hochreiter, et al. on Sep. 14, 1992. Such description, though not necessary to an understanding of the operation of the gate of the present invention, is also incorporated by reference herein.

The gate drive system 500 acts through a crank arm 501 and eccentrically mounted pin (FIG. 10) forming a unitary part of the shaft 502 of the drive system to produce a pendulum-like motion of the gate 100 about the pivot axis so as to provide an arcuate movement of approximately $6\frac{1}{2}°$ about 15°, so as to move the film past the imaging apparatus 15, 16 of the scanner 10 during the scanning operation.

Figure 10:
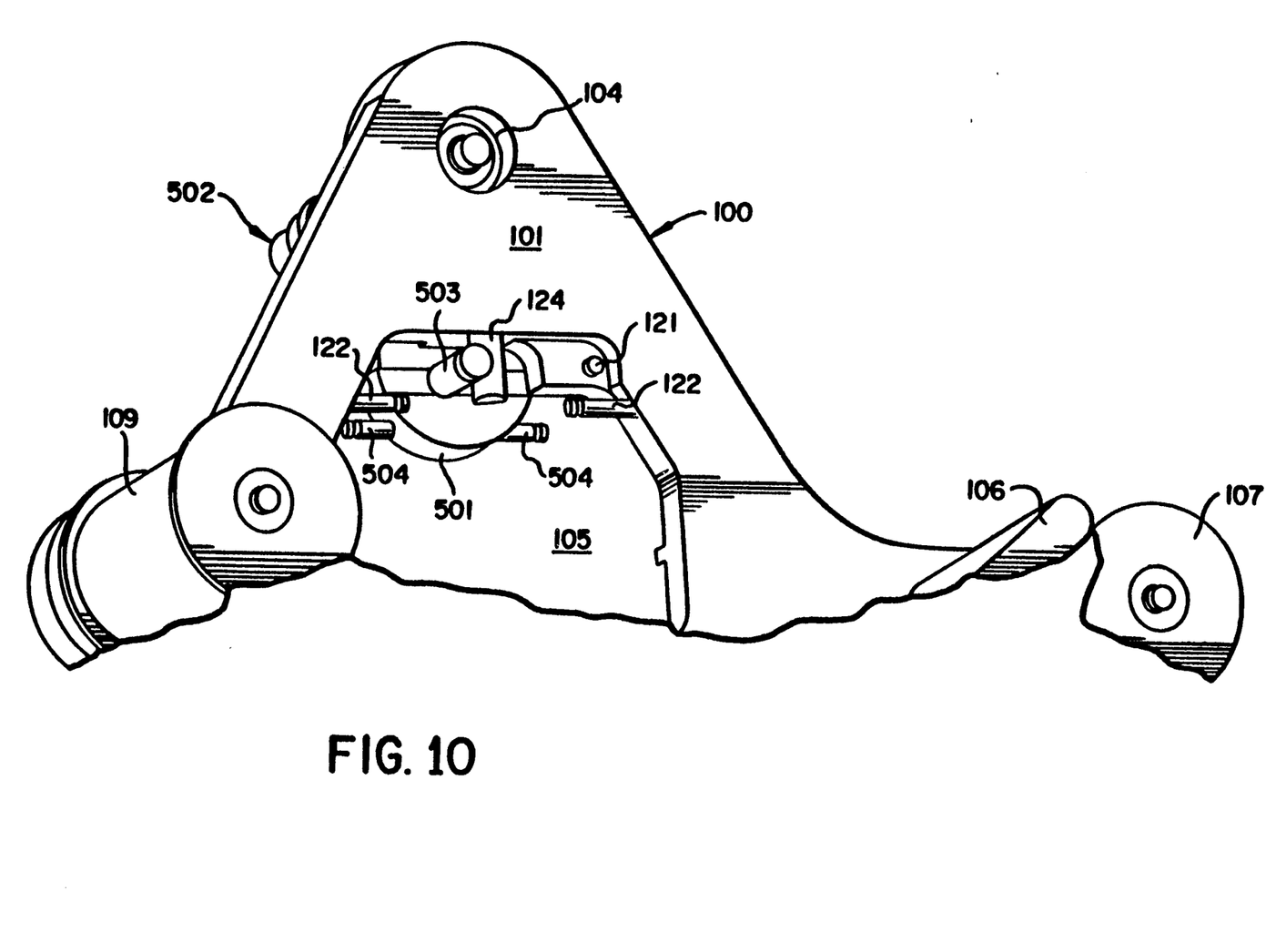
FIG. 10 is a perspective view of a cut-away portion of the gate and the eccentric crank-pin arrangement portion of the drive system of the present invention.
Figure 11:
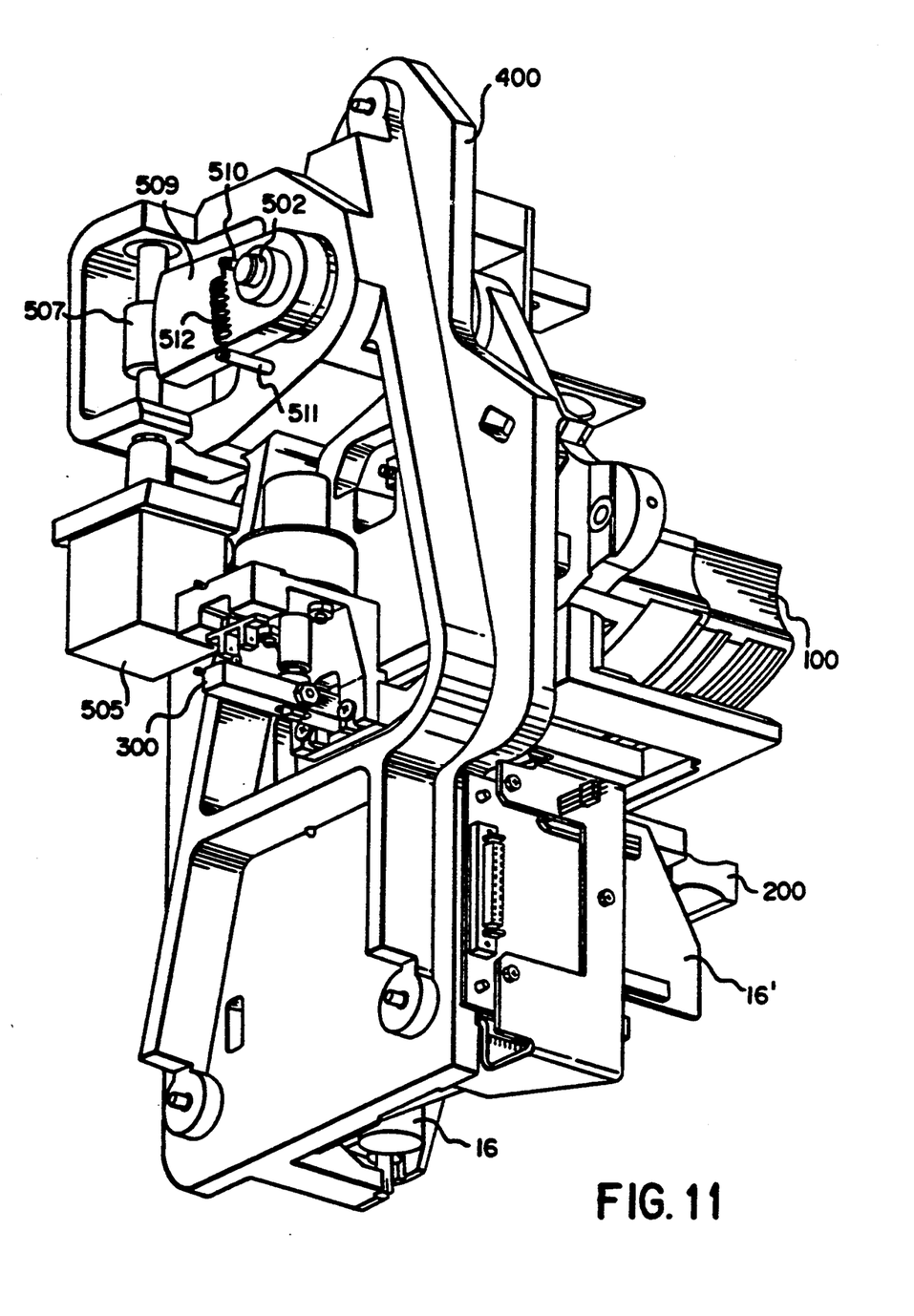
FIG. 11 is a rear perspective view of the optical chassis of FIG. 9 but schematically showing the basic elements of the gate drive system of the present invention.

The gate drive system whose shaft 502 and crank arm 501 are shown in FIG. 10 are also mounted on the optical chassis 400, and the shaft 502 passes through an aperture of the optical chassis 400. A central portion 105 of the gate 100 is cutaway and sized so as to provide room for movably mounting the gate on the optical chassis 400, while permitting a mounting which accommodates a conventional integrating cavity 15 for scanning the image on the film to pass through the gate 100.

The lower surface 102 of annulus segment 106 of the gate 100 is provided with a standard size scanning aperture through which the scanning operation is to take place as described above. A clamp mechanism 300 (shown generally in FIG. 2) can be attached to the gate 100 on a mounting surface so as to clamp the film F (shown in long-dashed lines in FIG. 5) around the periphery of the aperture at a desired frame of the film. Although not necessary to an understanding of the operation of the gate drive system 500 of the present invention, description of the clamping arrangement 300 is found in co-pending application Ser. No. 943,423 entitled CLAMPING ARRANGEMENT FOR FILM SCANNING APPARATUS filed in the names of Tomi Lahcanski, et al. on Sep. 14, 1992, the contents of which are incorporated by reference herein.

An entrance idler roller 107 pivoted on a journal 108 is provided at one end of the gate 100 into which the film F is led as shown in FIG. 5, and an exit idler roller 109 pivoted on a journal 110 is provided at the opposite or exit end of the gate 100. Both rollers 107, 109 rotate freely about the respective journals 108, 110. In FIG. 5, the film F is shown being lead over the entrance idler roller 107 and under exit idler roller 109 as the film F passes over the scanning surface 102 of the gate 100 during the high resolution pass. It will be seen that the surface 102 on the annulus segment 106 of the gate 100 in the area proximate the entrance idler roller 107 is provided with a slight curvature 111. The slight curvature 111 as well as the placement of the idler rollers 107, 109 are sized and configured so as to assist in making a paper laminate attached to the film F for reprocessing orders flatter, in the absence of which the edge of the film F may not properly be in the tracking area for achieving proper registration with the aperture 103 and the best possible resolution of the image on the film for digitization by the imaging system 15, 16.

It will also be understood that the aperture 103 against which the frame of film F to be imaged is clamped is symmetrical about the pivot axis 104 in the initialization position of the gate 100 so that a complete scanning operation takes place as the gate moves from the extreme right side to the extreme left side of the arc and vice versa as it is driven by the driving system 500. Although this arc is about 15°, the gate 100 can actually travel through an arc of about $7\frac{1}{2}°$ of motion on each side of the vertical to provide a safety factor in the event of failure of gates sensor mounted on the optical chassis 400. In this connection, the gate 100 initializes itself to two sensors on the optical chassis 400 at start-up so as to identify a home position which is the prescanning vertical position that the gate 100 assumes during the prescanning operation of the film. During prescanning, the gate 100 does not move. When the high resolution pass takes place after the film F has been prescanned and rewound back onto the supply reel 12, the gate swings to an initial position (i.e. to the right as shown in FIGS. 1 and 2) based on a count of motor steps from the vertical home position. The gate then stops and waits for the film F to advance to the correct frame where the film is then clamped by the clamping mechanism 300, and the gate 100 is rotated in about 4 seconds to the leftmost position through an arc of about 15° to pull the film over the imaging apparatus 15, 16. If, however, a gate sensor were to fail, the gate 100 would nevertheless continue to be moved by the driving system 500 slightly beyond the home position so that it could ride up against a portion of the optical chassis 400 where no damage will be done to the other components of the scanning apparatus 10.

Figure 6:
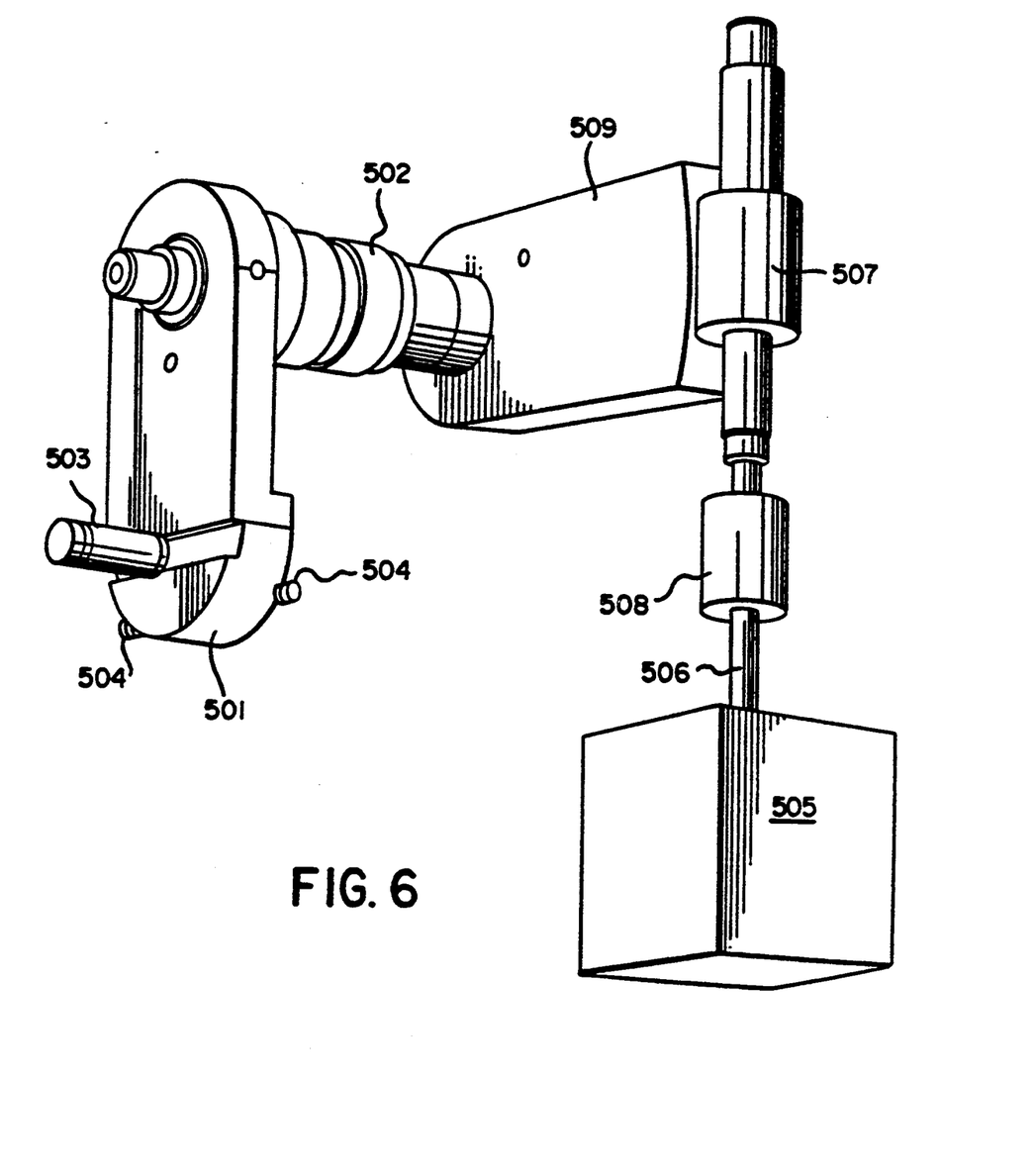
FIG. 6 is a perspective schematic view of the drive system elements shown in FIG. 8 but isolated from the gate and optical chassis.
Figure 7:
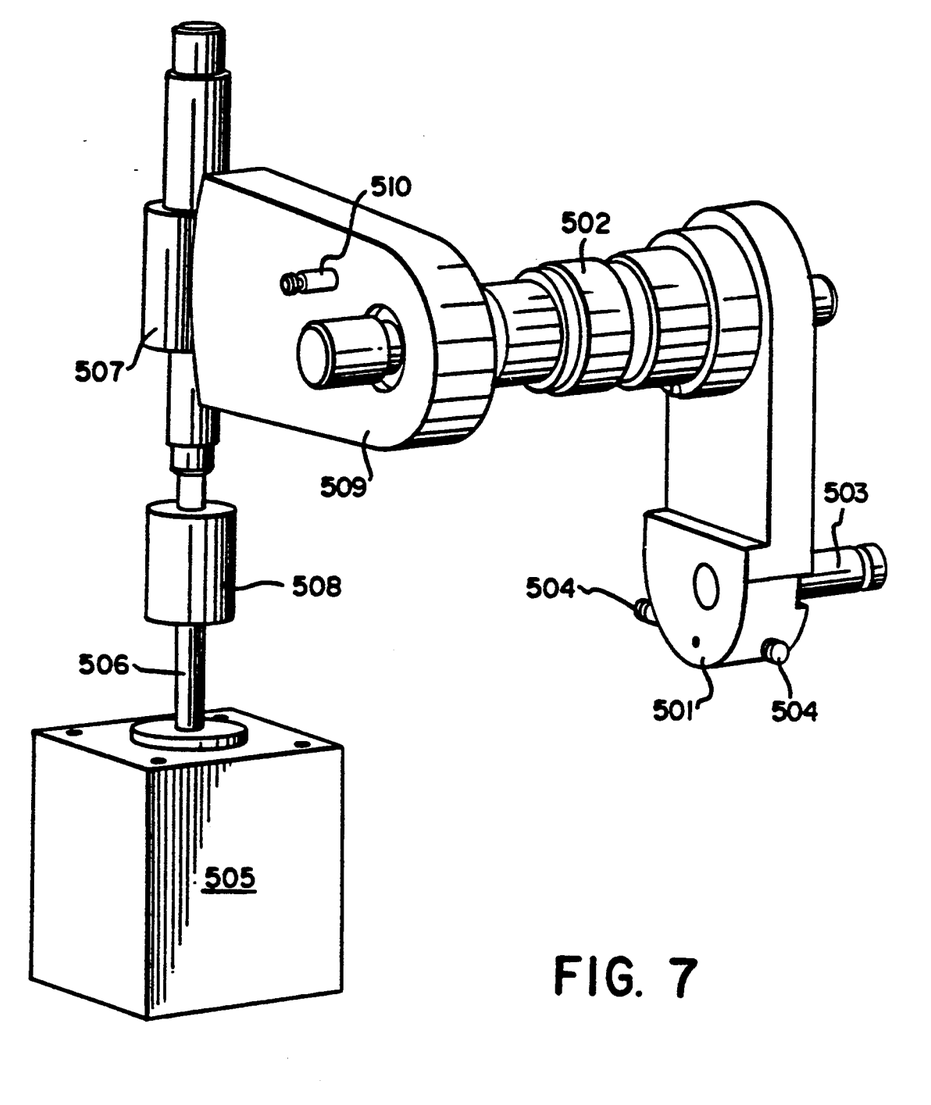
FIG. 7 is a view similar to FIG. 9 but showing the gate drive system from the rear.
Figure 8:
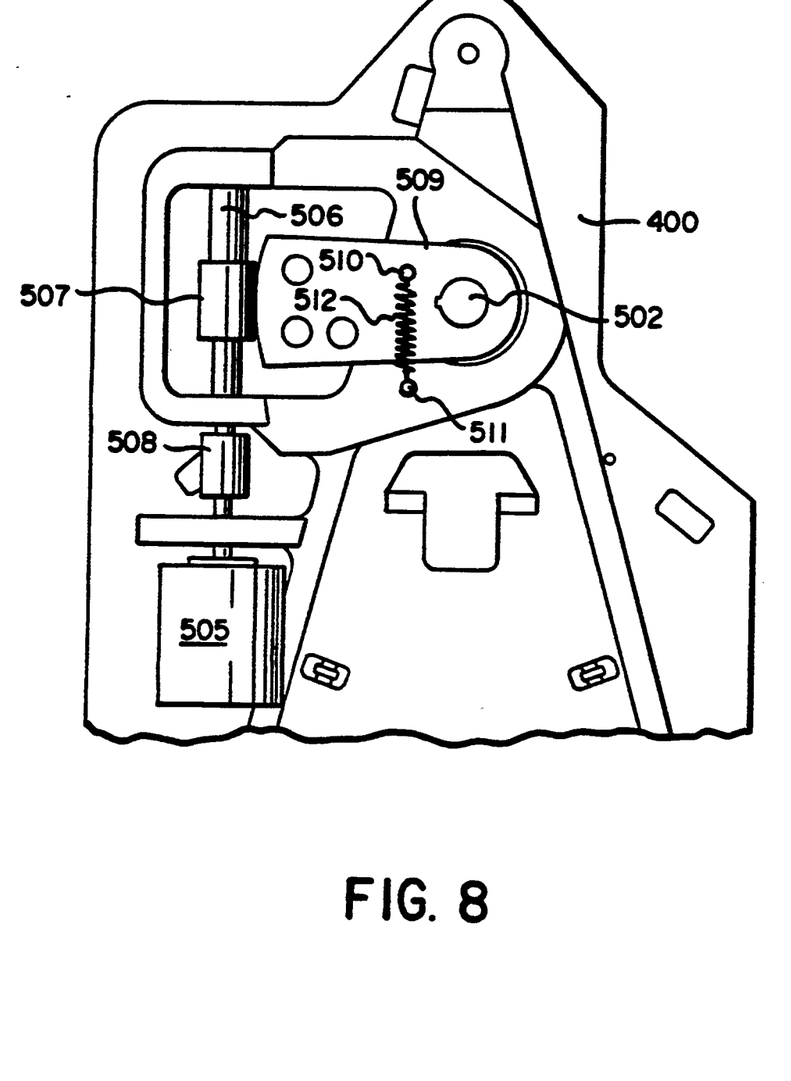
FIG. 8 is a rear elevational view of the chassis showing the gate drive system of the present invention mounted on the chassis.
Figure 9:
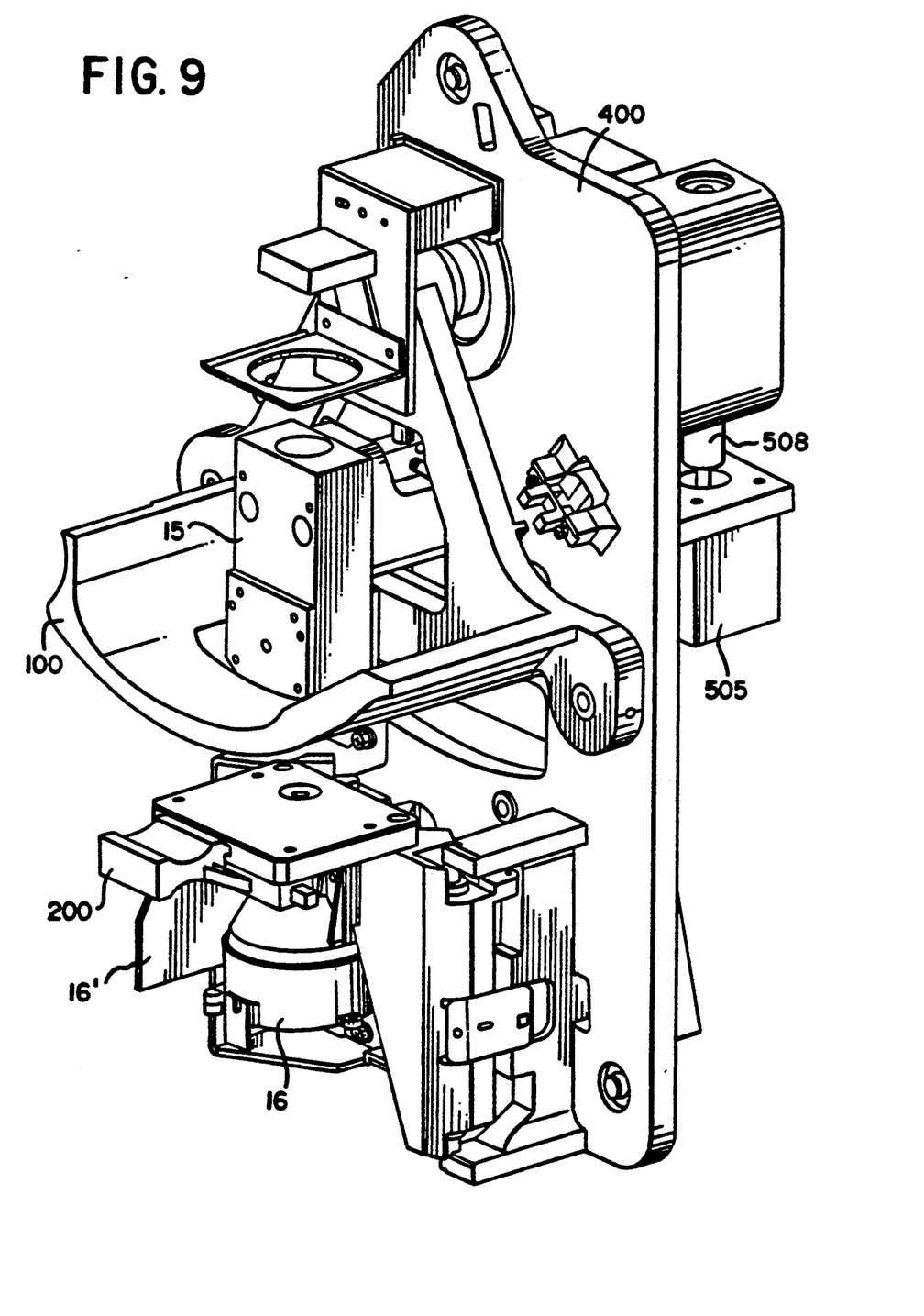
FIG. 9 is a front perspective view of a scanning apparatus optical chassis with the gate shown in FIG. 5 and a gate drive system in accordance with the present invention mounted thereon.

As shown in FIGS. 6–8, the gate drive system designated generally by the numeral 500 consists essentially of a reversible electric stepping motor 505 having a shaft 506 to which a worm 507 is driven through a conventional coupling 508.

The pivot shaft 502 is supportively mounted on the optical chassis 400 through the spherical bearing 104 as previously noted. One end of the pivot shaft 502 has a screw sector 509 fixedly mounted thereon for rotation with the pivot shaft 502 in about 4 seconds. The worm 507 and the screw sector 509 have meshing teeth sized and configured in a known way to produce a precise line-by-line movement of the gate 100 for scanning the film by producing the pendulum-like motion of the gate 100 around the pivot shaft 502. The worm 507 and sector 509 are normally loaded in one direction by an asymmetrical center of gravity the gate body 100 and the web tension of the film F. A pin 510 is pressed into the gear sector 509, and another pin 511 is pressed into the optical chassis 400 to accommodate a tension spring 512 which eliminates any backlash between the worm 507 and the gear sector 509 when the sector 509 is not loaded in the other direction. Thus, a precise positioning of the gate can always be maintained regardless of the action of the tension of the film. It will be understood, of course, that the reversible electric stepping motor 505 produces movement of the worm 507 in the clockwise and counterclockwise direction in response to signals from a CPU in the cabinet containing the scanning apparatus 10 and the system electronics so as to produce a pendulum-like motion of the gear sector 509 and a consequent pendulum-like motion of the gate 100 through the crank associated at the other end of the pivot shaft 502.

An eccentrically mounted pin 503, i.e. offset from the axis of shaft 502, projects from the front face of the crank 501, and two shorter pins 504 project laterally from the sides of the crank 501. Similarly, as can be seen in FIG. 10, a pin 124 projects vertically downward from the top of the aperture 105 of the gate 100; one short pin 121 extends through a flanges on the gate 100 (only one side of which is shown); and two longer pins 122 project from the sides of the aperture 105 of the gate 100. The pin 503 projecting from the front face of the crank 501 abuts the downwardly projecting pin 124 on the gate 100 to provide the driving connection for moving the gate 100 in a pendulum-like manner from the initialized home position in which the gate is vertically disposed to the right and to the left side of the scanning apparatus as seen in FIG. 2.

Biasing springs (not shown for sake of clarity) are connected between both ends of the pin 121 and the pin 503, and 122, 504, respectively in order to provide adjustability of the gate in the Θ X and Θ Z directions, as seen in the coordinate system of FIG. 1, so as to precisely line up the scanning aperture on the scanning surface 102 of the gate 100 with the scanning apparatus optics 15, 16. The aforementioned pins are positioned on the gate 100 and crank 501 relative to the pivot point 104 of the gate so as to have the minimum loads necessary imposed on the gate 100. Contact between the downwardly projecting pin 124 on the gate 100 and the pin 503 projecting from the face of the crank 501 is maintained in the leftward direction by the fact that the web tension of the film F and the weight balance of the gate tends to load the gate in that direction.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An apparatus for driving a scanning gate of a photographic film scanning apparatus, said scanning gate having an axis of rotation, said apparatus comprising a drive motor and a gearing arrangement driven by said drive motor and engaging said scanning gate so as to cause said scanning gate to travel back and forth in a pendulum-like motion along an arcuate path about said axis of rotation.

2. An apparatus according to claim 1, wherein said gearing arrangement comprises a drive shaft driven by said motor, a worm coupled with said drive shaft, a gear sector engaging said worm and being coupled to a pivot shaft, a crank arm rotated by said pivot shaft and being coupled with said scanning gate so as to cause said pendulum-like motion of said scanning gate along said arcuate path about said axis of rotation.

3. The apparatus according to claim 13, wherein said motor is a reversible motor.

4. The apparatus according to claim 13, wherein a biasing device is arranged between the gear sector and a chassis of the scanning apparatus to maintain a positive engagement between the worm and the gear sector.

5. The apparatus according to claim 13, wherein biasing devices are connected between the crank arm and the gate to provide for adjustment of the gate about two axes.

6. The apparatus according to claim 5, wherein said motor is a reversible stepping motor.

7. The apparatus according to claim 6, wherein an additional biasing device is arranged between the gear sector and a chassis of the scanning apparatus to maintain a positive engagement between the worm and the gear sector.

8. The apparatus according to claim 7, wherein the biasing devices between the crank arm and the gate include plural springs extending laterally from a pin projecting from a surface of the crank arm facing the gate to a pin mounted on the gate and having an axis parallel to the axis of the pin projecting from the surface of the crank arm, and plural springs extending from pins projecting from opposite sides of the crank arm to pins on the gate having axes parallel to the axes of the pins extending from the opposite sides of the gate.

9. The apparatus according to claim 7, wherein the gate is coupled with said pivot shaft via a spherical bearing.

10. A method for driving a scanning gate of a photographic film scanning apparatus, comprising the steps of
driving a worm gear in one axis via a reversible stepping motor;
driving a meshing gear sector in a second axis perpendicular to the one axis via the worm gear;
biasing the worm gear and gear sector in a constant load position; and
moving the scanning gate through an arc about the second axis in a precise line-by-line scanning operation via a crank arm operatively associated with the gate.

11. The method according to claim 10, further comprising the step of aligning the gate with imaging components of the scanning apparatus around third and fourth axes.

* * * * *